United States Patent [19]

Minogue et al.

[11] 3,974,552

[45] Aug. 17, 1976

[54] APPARATUS FOR CONSTRUCTING THREE-DIMENSIONAL SIGN CHARACTER

[75] Inventors: Robert W. Minogue, Cupertino; Lloyd E. Troyer, San Carlos, both of Calif.

[73] Assignee: LET-R-EDGE Of Canada Ltd., Alberta, Canada

[22] Filed: Sept. 12, 1975

[21] Appl. No.: 612,897

Related U.S. Application Data

[60] Division of Ser. No. 379,012, July 13, 1973, Pat. No. 3,937,384, which is a continuation-in-part of Ser. No. 356,983, May 3, 1973, abandoned.

[52] U.S. Cl. .................................... 29/33 S; 29/564; 156/461; 156/535; 156/578

[51] Int. Cl.$^2$ .......................................... B23P 23/00

[58] Field of Search ............... 29/33 S, 564, DIG. 1, 29/DIG. 3; 156/461, 535, 578

[56] References Cited

UNITED STATES PATENTS

| | | | |
|---|---|---|---|
| 3,414,305 | 12/1968 | Minogue | 156/308 X |
| 3,476,631 | 11/1969 | Huffman | 156/578 X |
| 3,589,975 | 6/1971 | Andrews et al. | 156/244 X |

*Primary Examiner*—Gil Weidenfeld
*Attorney, Agent, or Firm*—Townsend and Townsend

[57] ABSTRACT

A three-dimensional sign character is formed with improved circumscribing opaque metal sheet strip siding. The sign, typically having an interior light source, includes a translucent plastic face circumscribed by opaque sheet metal strip siding. The sheet metal strip siding includes a plastic strip bonded directly by gluing to a freshly abraded band on the sheet metal strip. Convolute folds are formed on either side of the sheet metal strip. One convolute fold is formed adjacent an edge of the plastic strip so as to extend angularly above and abut the plastic stripping to function as a light stop. The secured plastic strip serves as the bonding point to the translucent face of the sign. The sheet metal strip siding is particularly adaptable to continuous formation on a specialized rolling mill including the steps of preheating the strip, abrading a band on the strip, gluing over the abraded band, placing a plastic strip over the glue covered abraded band, working opposite edges of the strip with a rolling mill to produce convolute folds, registering the plastic strip to the convolute folds, and heating the strip to cure and bond the registered plastic strip to the abraded band on the sheet metal strip.

2 Claims, 19 Drawing Figures

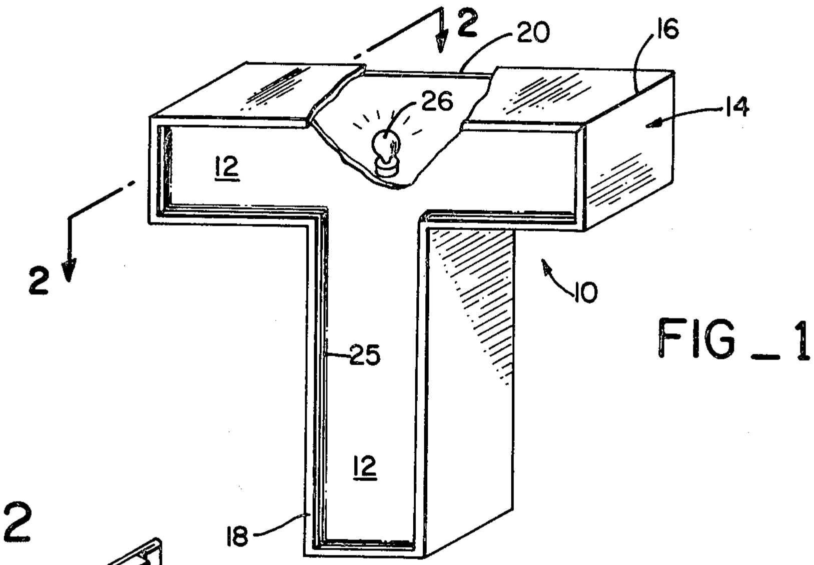
FIG _ 1
FIG _ 2
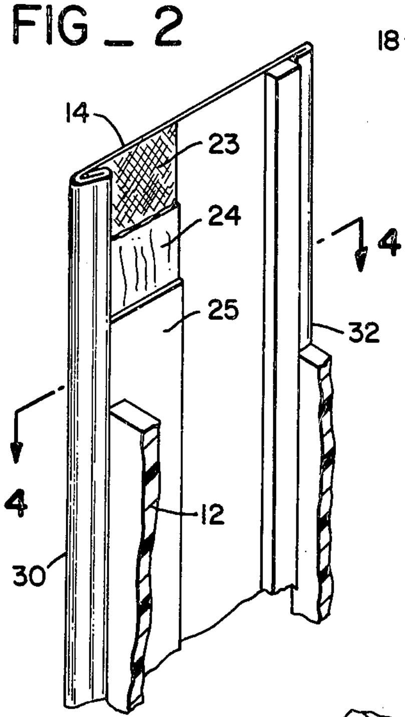
FIG _ 3
(PRIOR ART)
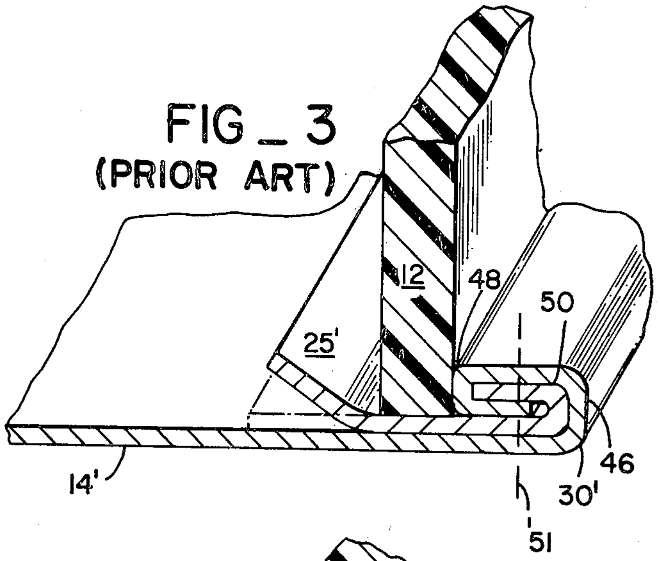
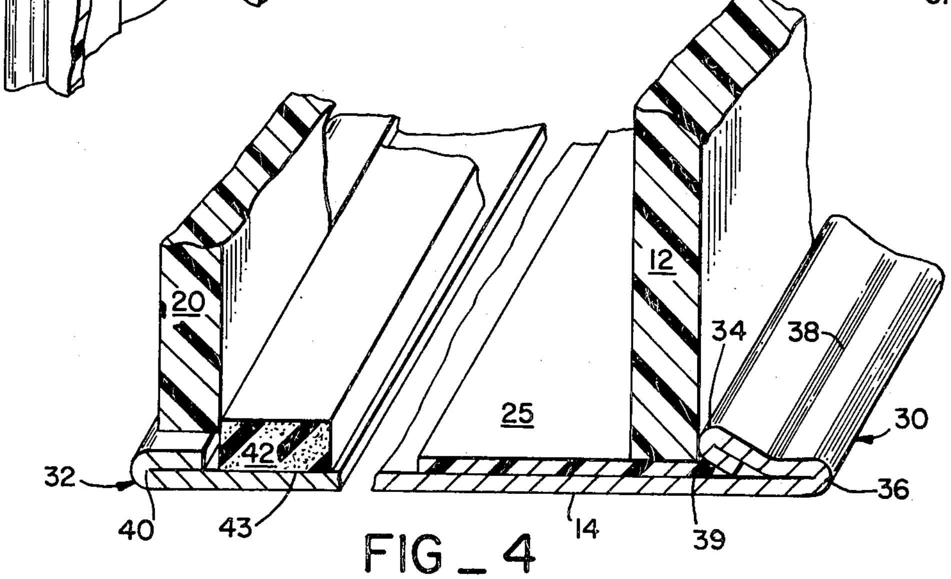
FIG _ 4

FIG_6
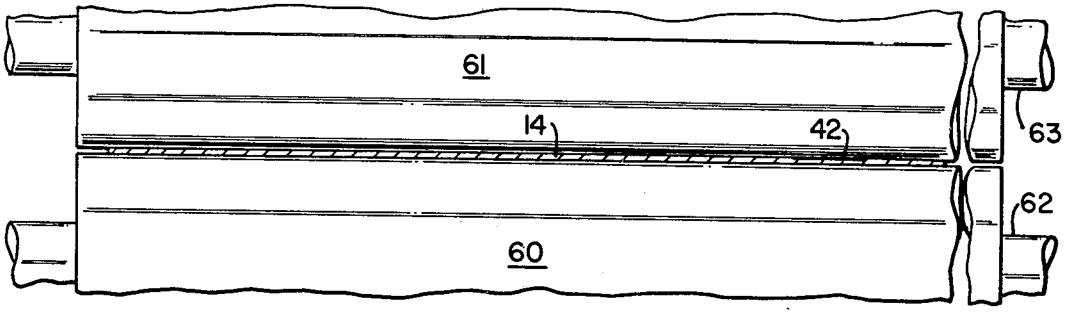
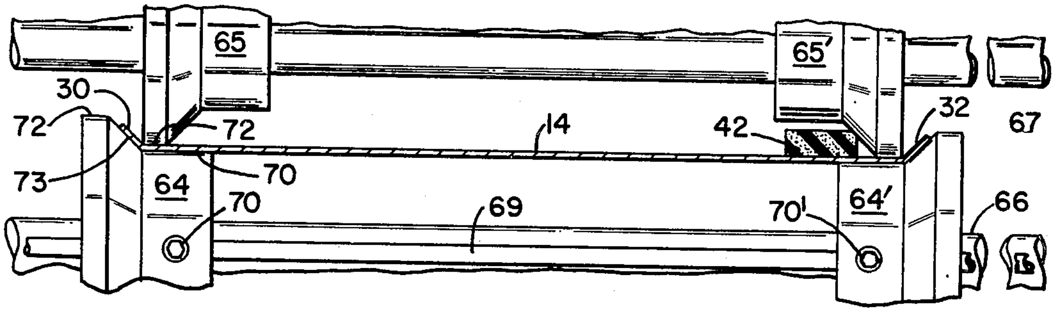
FIG_7
FIG_8
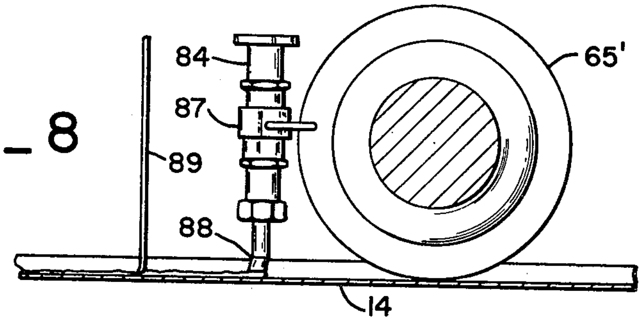
FIG_9
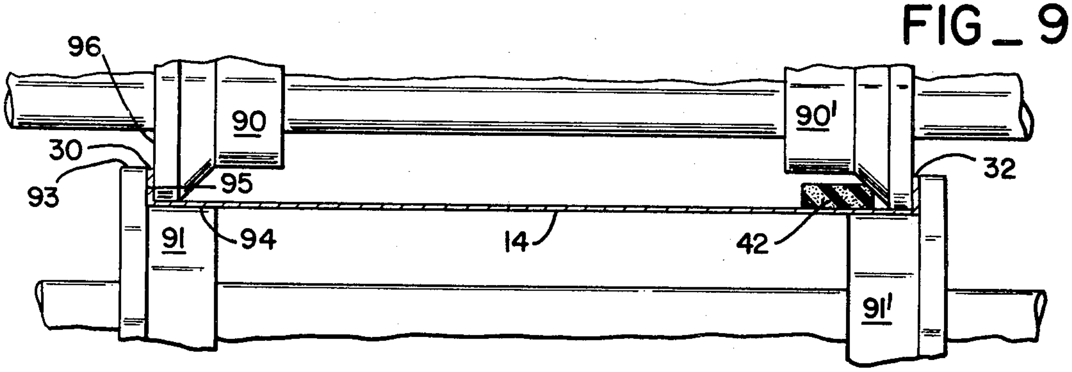

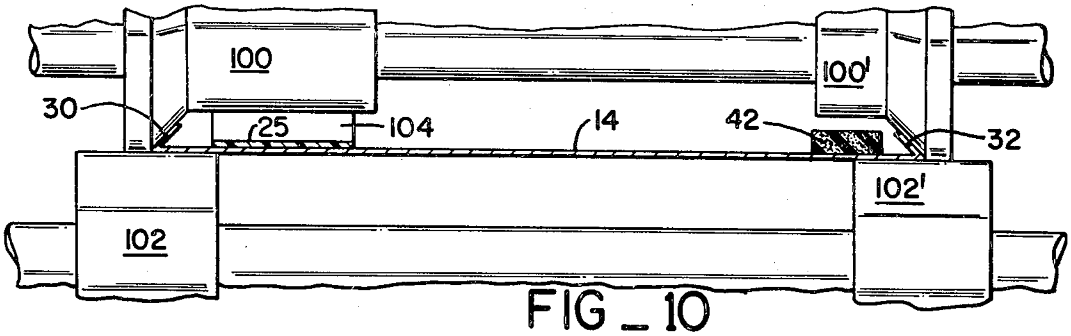
FIG _ 10
FIG _ 11
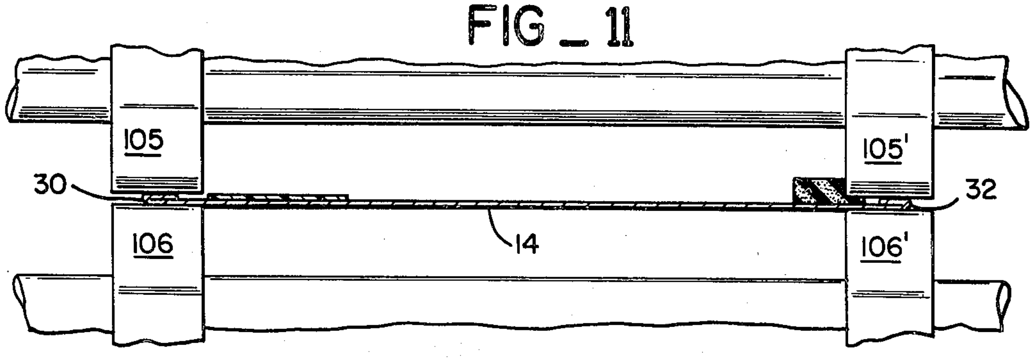
FIG _ 12
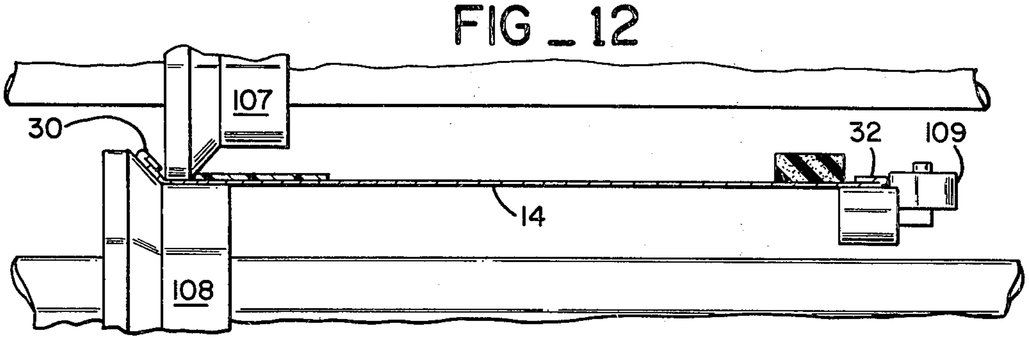
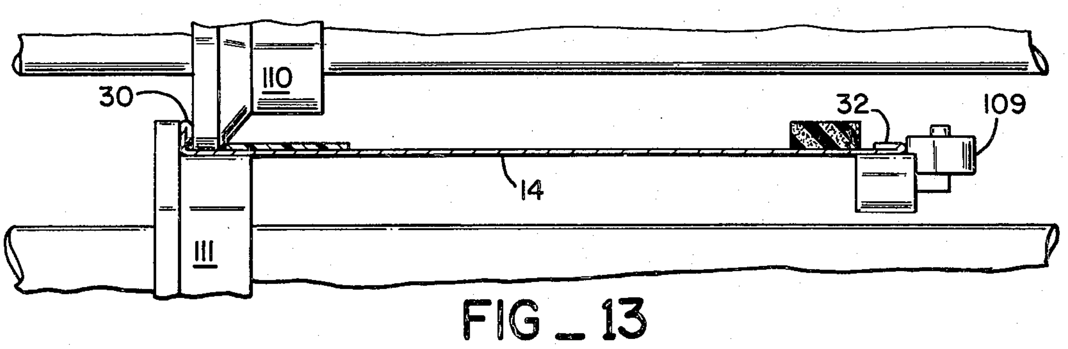
FIG _ 13

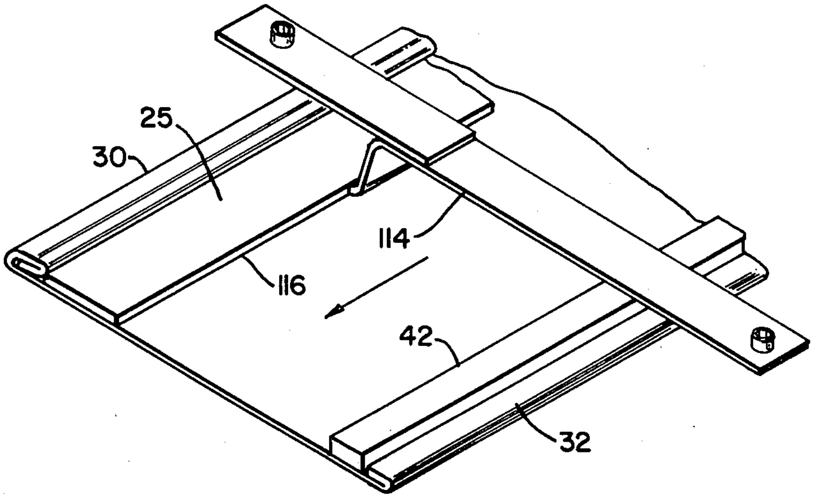
FIG _ 14
FIG _ 15
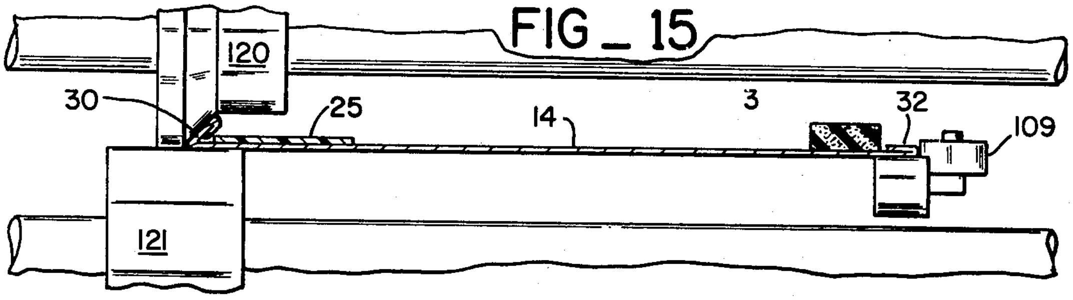
FIG _ 16
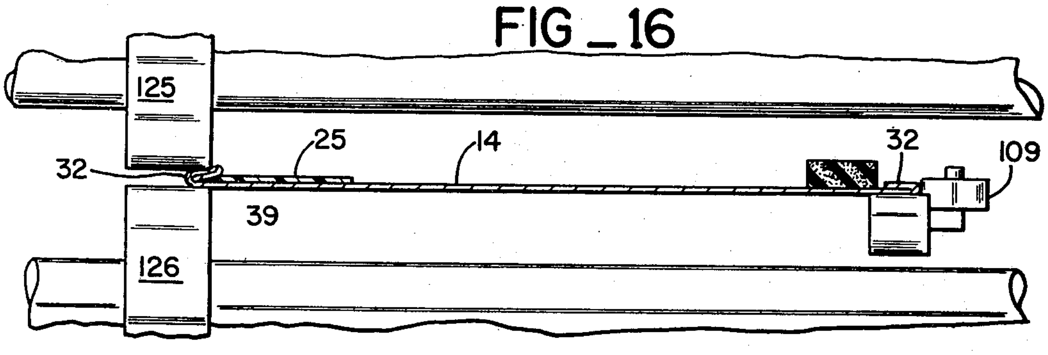

FIG _ 17
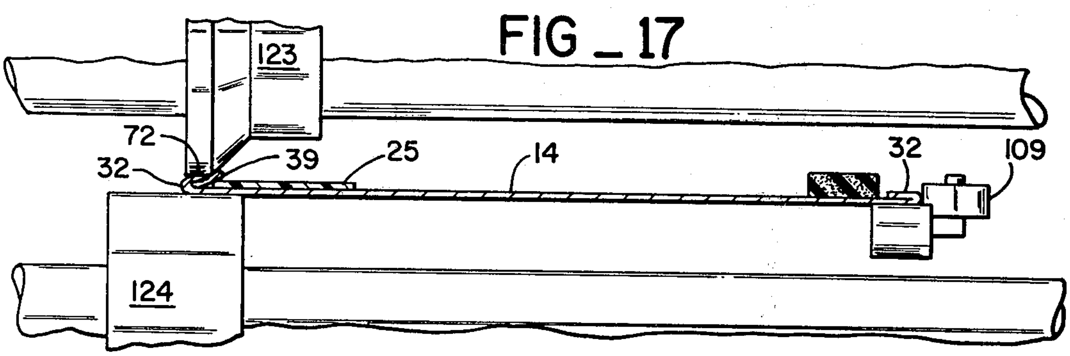
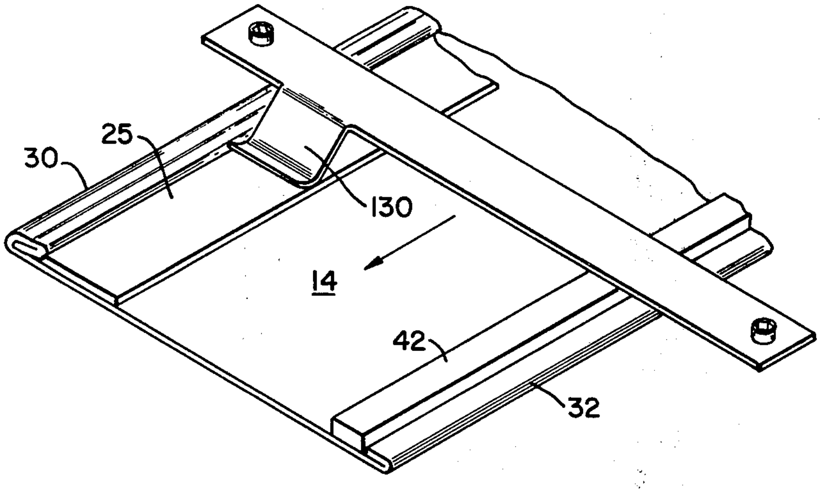
FIG _ 18
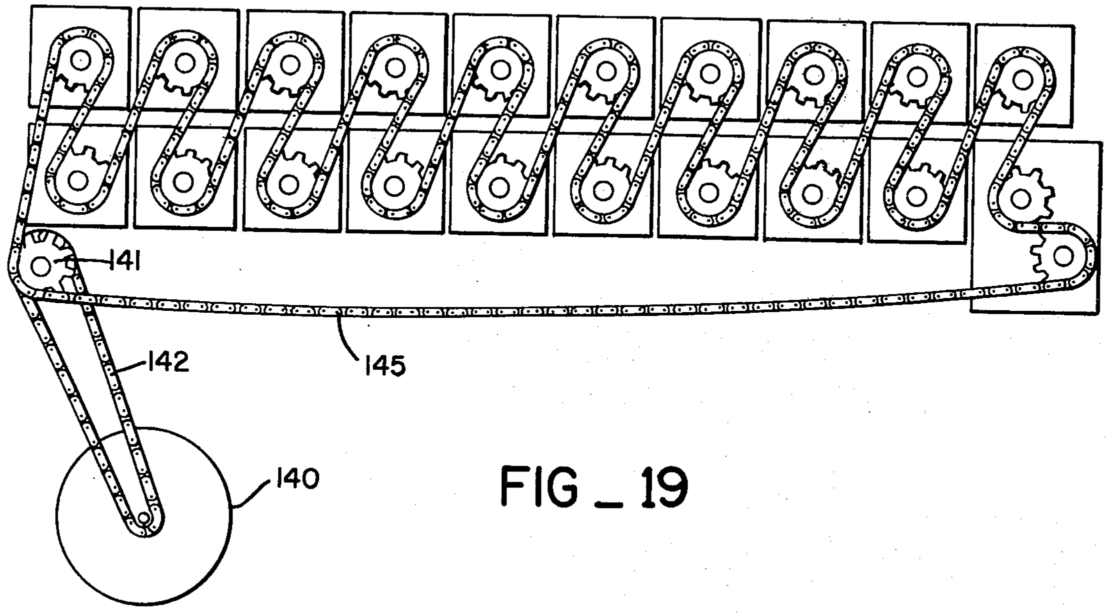
FIG _ 19

APPARATUS FOR CONSTRUCTING THREE-DIMENSIONAL SIGN CHARACTER

This is a division of application Ser. No. 379,012, filed July 13, 1973, now U.S. Pat. No. 3,937,384, which is a Continuation-in-Part of our U.S. patent application Ser. No. 356,983, filed May 3, 1973, entitled "Three Dimensional Sign Character" and now abandoned.

The invention relates to three-dimensional sign characters, and in particular to sign characters formed by attaching a plastic character face to a metal shell. An improved circumscribing sheet metal strip shell is disclosed together with a process and apparatus for producing the circumscribing sheet metal strip shell.

BACKGROUND OF THE INVENTION

A problem has been encountered in the construction of signs having three-dimensional characters. The face of the character generally is translucent plastic and the sides of the character are a sheet metal strip, and effectively joining the plastic and sheet metal strip has proved difficult. Plastic can not be fixed directly to the sheet metal strip, but requires an adhesive or mechanical joint.

Regarding adhesive joints between the circumscribing sheet metal strip and the typically translucent plastic character face, this solution has not been satisfactory. It has been found quite difficult to simply glue the thin plastic face directly to the sheet metal strip and achieve a bond with acceptable strength and adhesion. In most three-dimensional signs only the edge of the translucent plastic face is in contact with the metal shell. The translucent face is generally quite thin, even for a relatively large sign, rarely exceeding ¼ inch. This presents only a relatively small surface-to-surface connection between the translucent plastic face and the sheet metal strip shell, which greatly decreases the possible strength of an adhesive bond therebetween. In gluing the face directly to the sheet metal strip shell, the situation is aggravated by the presence of the face against the metal which prevents the penetration of glue across the face where it abuts the sheet metal strip siding. This prevents the formation of an adhesive bond across the entire thickness of the abutted face. These difficulties have heretofore prevented the sole use of an adhesive bond to attach the plastic face to the metal shell, since a bond of adequate strength simply cannot be formed in this manner with glues presently available.

A possible solution to the above problems has been to apply adhesive two times to the metal sheet strip. In the first application, the adhesive was spread and allowed to form a cured layer prior to attachment of the plastic face. In the second application, adhesive on the abutted edge of the plastic sign face was bonded on the previously cured layer of adhesive.

This solution has not been satisfactory. When adhesive is applied to attach the plastic face, the adhesive and its solvent attach the cured layer and destroy the continuity thereof and result in a bond surface which is insufficient to provide the desired strength.

Regarding mechanical joints, the plastic face is usually so thin that it is quite difficult to directly attach the plastic to the sheet metal strip with screws or bolts. L-shaped brackets could be used, but are unacceptable since they interfere locally with the visual qualities of the sign. Typically, such brackets locally obscure or block light passing through or reflected from the translucent sign face resulting in an irregularly appearing or illuminated and hence unacceptable sign product. Various arrangements of slots and grooves have been attempted with limited success.

The complexity of the contrivances which have been necessary in the past to form an effective joint between the plastic face and the sheet metal are perhaps best illustrated by the patent to Minogue, U.S. Pat. No. 3,414,305. In that patent, the sheet metal was rolled into convolutes, and an intermediate plastic piece was compressed within the convolutes, typically in the form of a "Pittsburgh lock". The plastic face was then bonded to the intermediate plastic piece. While this yielded a mechanical bond between the plastic face and the sheet metal, a relatively complex and expensive process was required to form the convolutes in the metal and compress the intermediate plastic piece therein. Moreover, the ultimate sign product left much to be desired.

Mechanical locks between sheet metal rolled into convolutes and intermediate plastic stripping have several disadvantages. First, such locks can only be formed on metal strips of finite length—typically in the order of 10 to 12 feet—on a machine known as a metal brake. Numerous repetitive sequential operations of the metal brake are required, making the cost of the mechanical bond between the metal and plastic strip expensive.

Secondly, the plastic strip pulls away from its backing, even when ordinary gluing of the strip to the metal strip is attempted. This occurs after the translucent face of the sign has been secured to the circumscribing sheet metal strip sides of the sign. Typically, dirt lodges in between the metal strip and the plastic strip held to the metal by the mechanical lock in the manner illustrated in FIG. 3. This dirt forms an unsightly border to the sign display, rendering either its expensive cleaning or replacement necessary.

Additionally, the mechanical lock at its edge includes multiple overlying layers of material. In the case of the Pittsburgh lock, three overlying layers of material are composed of the metal of the sign strip, and two overlying layers of material are formed of plastic, for a total of five overlying layers. This combined five overlying layer thickness of metal and plastic cannot be conveniently bent, especially to right or acute angles without cracking or tearing of at least one of the metal layers or at least one of the plastic layers, or both. This often weakens the construction of the sign at its most critical areas.

Finally, the Pittsburgh lock is not acceptable for production on a rolling mill. Typically, attempts to compress multiple layers of material on a rolling mill with sufficient compression to form a mechanical lock results in elongation of the edges of the circumscribing sheet metal strip with respect to the central portion of the circumscribing sheet metal strip. This produces a sinusoidal curve of the edges relative to the central portion of the metal strip. This sinusoidal curve of the edges of the metal strip renders impossible the attachment of the edge of the circumscribing sheet metal strip to the translucent sign face.

Moreover, when the product is formed on a metal brake as distinguished from a rolling mill, uneven width of the circumscribing metal strip results. As opposed portions of signs require precisely correspondent thicknesses of circumscribing metal strip, an unsatisfactory sign product results.

SUMMARY OF THE INVENTION

The present invention provides a relatively simple product and resultant method for attaching the plastic face of the sign character to the sheet metal strip siding, but which still provides a sufficiently rigid bond therebetween. An intermediate plastic strip is first securely bonded to the sheet metal strip, typically adjacent one of the edges thereof, with a special plastic-to-metal adhesive. The plastic face is then integrally bonded with the plastic strip with a plastic-to-plastic adhesive. The result is a very firm, rigid three-dimensional structure which can stand alone as a single sign character or be used as a portion of a unitary sign.

Typically, the metal edge adjacent the plastic strip is convoluted upon itself. Preferably, one of these convolutes is bent so as to angularly overlap and protrude above the plastic strip. This convolute does not function to grip the plastic strip in any way, but does function to provide an opaque light seal at the juncture of the abutted plastic face to the opaque and circumscribing sheet metal sign sidewall.

The method of production of the sheet metal strip siding, includes first abrading a band along the surface of the sheet metal strip. This abraded band is then coated with a plastic-to-metal adhesive usually in a liquid solvent. The strip of plastic material is immediately placed over the adhesive and pressed thereon to spread the adhesive to a continuous interface over the entire width of the strip between the strip and the abraded band on the sheet metal strip. Typically, and before the adhesive cures, the edge of the metal sheet strip adjacent the plastic strip is worked to provide an abutted overlapping convolute and the plastic strip is registered to abut this overlapping convolute. Next, the adhesive is allowed to cure so that the plastic strip comes firmly bonded to the metal sheet.

In the formation of the final sign product, the plastic face of the sign is place in abutment to the circumscribing metal sheet strip at the plastic strip. A plastic-to-plastic adhesive is applied at the point of abutment between the plastic strip on the circumscribing metal sheet strip and the edge of the plastic face. The plastic-to-plastic adhesive contains a solvent which mutually plasticizes the strip and the plastic face so that the plastic material flows together and then resets to form an integral bond.

The disclosed apparatus for producing the improved sheet metal side strip of this invention includes a machine which passes and processes a sheet metal strip continuously through it. The machine includes a preheating station, an abrading station, a gluing station, a metal edge working station, and finally a curing station. Provision for takeup of the sheet strip siding product is made at a convolute metal roll.

FURTHER FEATURES AND ADVANTAGES OF THE INVENTION

By firming bonding the intermediate plastic strip to the metal, the problems involved with simply gluing the plastic directly to the metal are avoided. First, curing the plastic-to-metal adhesive allows the plastic strip to gain full purchase on the metal without interference from the plastic face. The plastic strip is relatively wide to provide a large surface-to-surface connection between the strip and the metal so that an extremely strong bond is formed. Second, the plastic strip extends across the entire thickness of the abutted edge of the plastic face so that the bond subsequently formed with the face utilizes the full thickness of the abutted edge of the plastic face. Third, since two types of plastic form the critical bond between the plastic strip and the translucent plastic face, the material can flow together when the plastic-to-plastic adhesive is applied, so that when the material resets, an integral bond is formed. Fourth, the intermediate plastic strip prevents the solvent in the plastic-to-plastic adhesive from attacking the bond between the strip and the metal. Hence, a connection between the plastic face and the metal shell is formed which is sufficiently rigid to be used in sign construction.

Moreover, since the product does not include a mechanical lock, it can be continuously formed on a processing machine at a continuous rate where uniform width and dimension of the product is assured.

Additionally the plastic strip, by virtue of its being firmly bonded over a large area to the sheet metal strip of the sign siding, will not pull away from the metal siding when it is subsequently bonded to the translucent face of a sign. This also prevents the collection of dirt and the like between the metal strip and the plastic strip which requires either cleaning or replacement of the sign.

A further feature of the invention is that the convolute edges, while functioning to provide a light seal, do not have overlying layers of plastic entrapped between them. Consequently, when the circumscribing edges of the side strip are bent at acute angles to circumscribe letters of other sign characters, breaking or cracking of either the metal or the plastic stripping or both does not occur.

Moreover, the convoluted edges can provide a light seal between the opaque circumscribing sheet metal strip siding and the translucent portion of the sign. All light must pass through the translucent portion of the sign providing a clean sign display with a uniformly sharp border.

In the process and apparatus for the production of the stripping, the steps of formation are interrelated for most efficient production. Specifically, the steps of preheating and abrading a band on the typically aluminum sheet metal strip provides energy to the metal strip so that when subsequent placement of the glue on the abraded band and placement of the strip overlying the glue occurs, rapid curing of the strip of the abraded band on the sheet metal strip can subsequently occur.

Further, the apparatus for manufacture includes a rolling mill with opposed rollers each slideably mounted on relatively wide shafts journaled at both ends. The rollers are adjustable along their shaft. Thus, the apparatus of this invention can accommodate stripping of various widths.

Moreover, the strip is worked by rollers spaced a predetermined distance from the strip edges. This permits the product to be of a constant width.

Yet another advantage of the apparatus is that adjustability of the mill for different widths of sheet metal strips is possible by the expedient of relocating the rollers on their shaft to different spacings between the journals. Different widths of metal strips for different widths of circumscribing sheet metal strip sidings can be provided.

Yet another advantage of the apparatus for producing the metal is that it is easily adjustable for different thicknesses of sheet metal. Specifically, shimstock of different dimension can be inserted in between the journals mounting the opposed rollers. This shimstock enables machine adaptability to a variety of thicknesses and stiffnesses of the metal being worked therewithin.

Yet another feature of the apparatus for the manufacture of this invention is that the mill is capable of working on painted aluminum stripping. Typically, a rubber roller placed ahead of the rolling mill provides the velocity to the passing strip relative to the downstream working rollers. These downstream working rollers rotating at precisely the same speed as the driving rubber rollers, work the metal edges so that undesired cracking, scraping or scratching of the painted aluminum stripping is avoided.

Yet another advantage of the apparatus and process for producing the improved circumscribing metal siding of this invention is that the product can be continuously taken up in a convolute roll.

An advantage of taking the product up in a convolute roll is that it is not limited to discrete lengths. Rather, the product is limited to a very long single length which can be stored on a convolute roll. Thus, end wastage in letter formation can be kept to a minimum.

Yet another advantage of taking up the finished product in a convolute roll is that packing of the product can occur in a minimal volume without the painted metal edges of the aluminum siding abrading because of contact.

The novel features which are believed to be characteristic of the invention, both as to their organization and method of operation, together with the further objects and advantages thereof will be better understood from the following description considered in connection with the accompanying drawings in which the preferred embodiments of the invention are illustrated by way of example. It is to be expressly understood, however, that the drawings are for the purposes of illustration and description only, and are not intended as the definition of the limits of the invention.

BRIEF DESCRIPTION OF THE DRAWINGS

FIG. 1 is a perspective view of the letter T formed according to the method of the present invention, the letter being broken away to illustrate an interior light source, the opaque sheet metal strip siding, the translucent sign facing, and the typically opaque interiorly reflective sign backing;

FIG. 2 is a perspective section along lines 2—2 of FIG. 1 partially broken away for illustrating the improved sheet metal strip siding of this invention;

FIG. 3 is a perspective section illustrative of opaque sheet metal strip siding of the prior art illustrating an edge of the sheet metal formed with a mechanical Pittsburgh type lock to secure plastic stripping to the metal and with the abutted translucent sign material secured to the plastic stripping;

FIG. 4 is a perspective section along lines 4—4 of FIG. 2 illustrating the configuration of the improved circumscribing sheet metal strip siding of this invention;

FIG. 6 is a side elevation section of opposed rubber driving rollers of the rolling mill of this invention;

FIG. 7 is a view of the first opposed working rollers of the rolling mill for providing an obtuse 45° bend at opposed edges of the metal sheet strip;

FIG. 8 is a side elevation of the glue application station of this invention which is hereshown located directed behind the rollers of FIG. 7;

FIG. 9 is a side elevation of opposed working rollers for providing a 90° bend at opposed edges of the metal sheet strip;

FIG. 10 is a side elevation of opposed working rollers for providing a 45° acute bend at opposed edges of the sheet metal strip as well as a station for the application of the plastic strip on top of the previously placed glue;

FIG. 11 is a side elevation of opposed working rollers for closing the acute angle bends previously formed in the opposed edges of the metal strip;

FIG. 12 is a side elevation of opposed working rollers for putting an additional 45° obtuse angle fold in one edge of the sheet metal without working the remaining edge of the sheet metal strip;

FIG. 13 is a side elevation of opposed working rollers for placing a right angle bend on one edge of the sheet metal strip without working the opposite edge of the sheet metal strip;

FIG. 14 is a perspective view of apparatus for registering the plastic strip to one of the worked edges of the sheet metal strip;

FIG. 15 is a side elevation of opposed working rollers for providing a 45° acute angle bend to the metal on one edge of the strip while not working the remaining edge of the strip;

FIG. 16 is a side elevation of opposed working rollers for closing the acute angle bend of FIG. 16 in accordance with this invention;

FIG. 17 is a side elevation of opposed working rollers for placing an obtuse angle bend to the convoluted edge of the metal strip adjacent the plastic strip;

FIG. 18 is a perspective view of an arm for firmly compressing the plastic strip to the metal prior to curing at the curing station; and, FIG. 19 is a view of the driving apparatus for the driving and working rollers of this invention.

DESCRIPTION OF THE PREFERRED EMBODIMENTS

Figure 5:
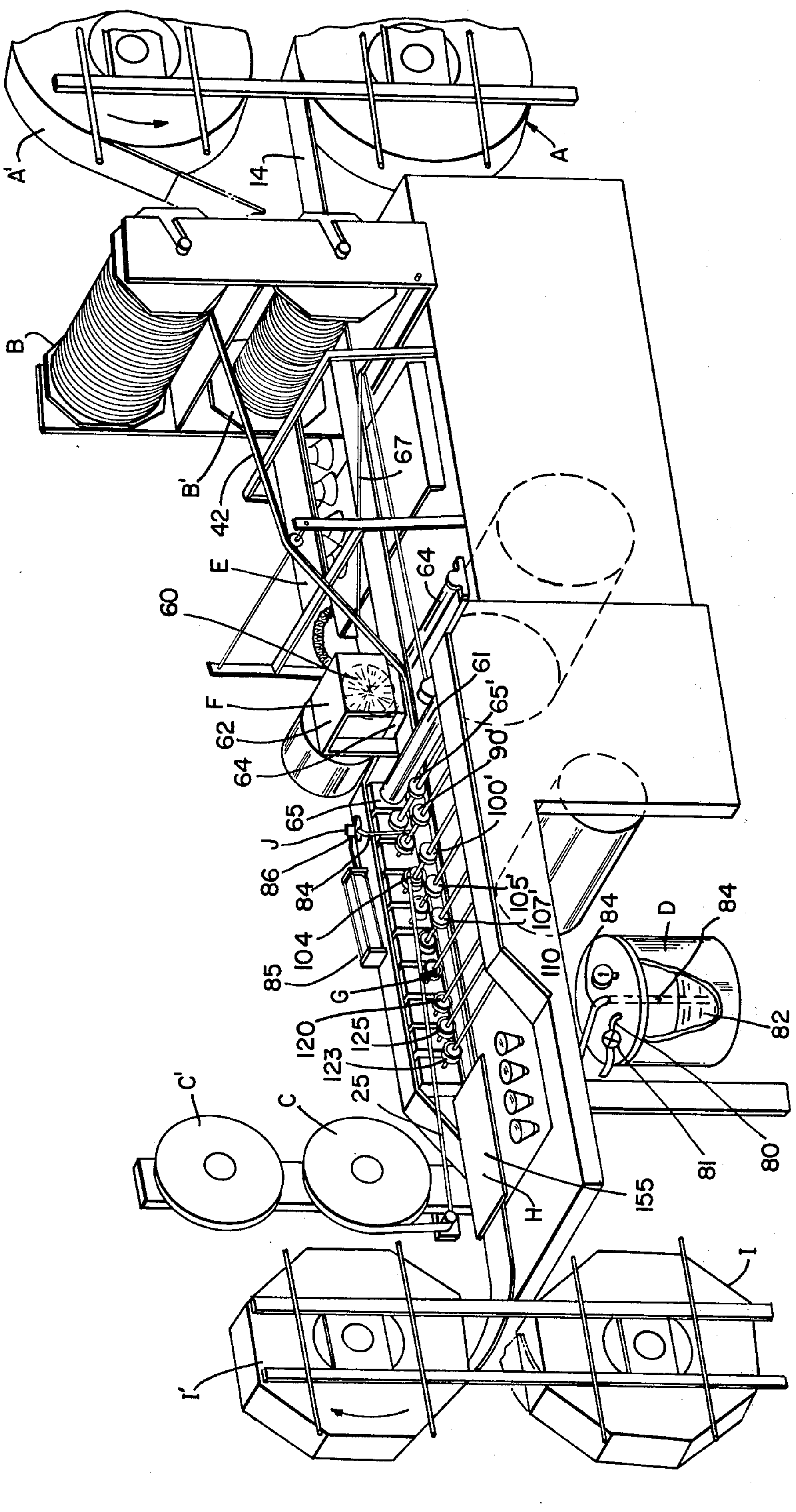
FIG. 5 is an apparatus for continuously producing by the process of this invention the sheet metal strip siding.

A sign character in the shape of a letter T formed according to the methods of the present invention is illustrated by way of reference to FIG. 1. The character 10 has a T-shaped translucent rigid plastic face 12 circumscribed by an aluminum or other type metal sheet strip siding 14. Aluminum is used almost exclusively for the metal sheet strip, but other metals can be used as well. The sheet metal strip is preferably continuous, so that a single sheet metal strip surrounds the letter face 12, and is joined at a seam 16. As will hereinafter be explained in more detail, the letter face 12 is slightly recessed from the visible lateral edge 18 of the metal sheet 14. This recession can be varied, from substantially at the lateral edge to significantly depressed therefrom to provide a variable design feature.

The letter includes an opaque wall 20 opposite translucent face 12. Wall 20 has the same T shape as face 12. Face 12 is fastened to the remaining edge of metal sheet 14. Typically, the side of wall 20 interior to the three-dimensional character 10 is provided with a reflective surface. A light source 26 is located inside character 10 to illuminate translucent face 12.

The manner in which the sheet metal strip 14 if fabricated can be seen with reference to FIG. 2. A relatively wide plastic-to-metal adhesive layer 24 is placed on an abraded band 23 on the sheet metal strip 14 adjacent one lateral edge thereof. A strip of plastic material 25 is bonded overlying the abraded band to the metal sheet 14 by the adhesive layer 24. (The thickness of the adhesive layer 24 and the plastic strip 25 are greatly exaggerated in the FIG.) As will hereinafter more fully appear, the letter face 12 is integrally bonded with the plastic strip 25 by applying a plastic-to-plastic adhesive to both the letter face 12 and the plastic strip 25 at the junction therebetween.

The sheet metal strip side illustrated in FIGS. 1 and 2 is formed in the following manner. First, the sheet metal strip 14 is preferably abraded at band 23 adjacent its lateral edge 30 to provide a rough surface. Typically, the abrading of this band serves two purposes. First, it removes layers of paint, oil, oxide or dirt which might otherwise interfere with the subsequent bond of the plastic strip 25 to the sheet metal strip 14. Secondly, it provides the relatively smooth surface of the metal with a roughened and irregular surface so that glue layer 24 can effect an improved bond of the plastic strip 25 to the sheet metal strip 14.

A plastic-to-metal adhesive is coated in a relatively wide strip 24 overlying band 23 adjacent lateral edge 30 of strip 14. Minnesota Mining and Manufacturing Corporation industrial adhesive No. 4475-50, developed specifically for adhesion to metals, is preferable, but any plastic adhesive which adhers to metals can be used. To more readily coat the adhesive on the metal, the adhesive can be carried in a liquid solvent, and the combination of solvent and adhesive coated on the metal sheet 14.

A relatively wide plastic strip 25 is immediately placed over the plastic-to-metal adhesive layer 24 and pressed thereon to spread the adhesive so that the entire width of the plastic strip is used to form a bond. The adhesive solvent is then evaporated, usually by applying heat from an infrared heater, and the plastic strip becomes firmly bonded to the metal sheet.

Typically, the opposed edges 30, 32 of the circumscribing metal sheet 14 are convoluted. Referring to FIG. 4, edge 30 is provided with a first convolute or U-shaped bend 34 at its edge. Secondly, a second convolute or U-shaped bend 36 is placed in the metal edge a distance removed from the first convolute 34. The metal edge 30 is worked so that convolute 34 extends upwardly from convolute 36 at an obtuse angle. This extension occurs at an obtuse angle bend 38.

It will be noted that convolute 34 abuts strip 25 at edge 39. This abutment occurs along the side of the convolute 34 so that a portion of convolute 34 extends upwardly and above the edge 39 of strip 14.

Edge 32 of metal siding 14 is bent with a convolute 40. Adjacent convolute 40 there is placed a strip 42 of closed cell urethane foam having a pressure sensitive adhesive layer 43.

The completed sheet metal side strip 14 as illustrated in FIG. 4, thus includes the sheet metal strip 14, the glued plastic strip 25, the strip abutted convolute 34, the first edge convolute 36, and the second edge convolute 40 with the attached foam border 42. This material can then be used for the construction of the letter character illustrated in FIG. 1.

Sheet metal strip 14 normally ranges between 4¼ inches and 9 inches in width, having a thickness of 1/10 inch to ¼ inch with the normal range of 2/10 inch. The sheet metal is typically coated with an alkaline-amine epoxy. On one side, the sheet strip is provided with an exterior coating. On the interior side or side upwardly exposed as shown in FIG. 5, the pigment of the alkaline-amine epoxy coating is white. The white coating is used to produce maximum reflectivity interior of the opaque side wall of the sign product.

Foam strip 42 is closed cell urethane foam with a pressure sensitive adhesive. The dimension of the strip can vary within wide limits but a strip ½ inch by ½ inch in section has been found to be preferred.

Plastic stripping is typically a butyrate cellulose strip normally 1 inch in width and normally 2/10 inch in thickness. The width of the strip can vary to virtually any desired accepted width. The thickness of the strip usually ranges between 3/10 inch and 1/10 inch. It is usually not desirable to exceed 3/10 inch thickness in the strip. This is because when the letter strip is bent to a right or acute angle, the strip can be subject to cracking with the sheet metal strip sign border product of this invention becoming correspondingly weakened. As a minimum dimension, strip thicknesses less than 1/10 inch are not preferred. This is because upon bonding to the translucent face 12 of a sign, the glue attacks the strip to the point of destruction where the strip is below 1/10 inch in thickness.

The plastic strip 25 of this invention must be complementary in material to the translucent face 12. As is known to those having skill in the art, like plastics bond to like plastics. Materials such as polycarbonate or acrylics (particularly methylmethaculate) have been used for both translucent sign face 12 and strip 25.

In the formation of the letter character of FIG. 1, translucent letter face 12 and opaque wall 20 are typically cut simultaneously with the strip for each overlying one another. Next, a length of sheet metal strip siding 14 sufficient to completely circumscribe both the translucent face 12 and the opaque wall 20 is cut. This strip is then bent to conform precisely to the contour of the translucent letter face 20 and the contour of opaque wall 20.

The letter face 12 is then placed in abutment with the plastic strip 25 now firmly bonded to the metal. A plastic-to-plastic adhesive, usually ethylene dichloride cement, is applied to the intersection of the letter face 12 of the plastic strip 25. The adhesive contains a solvent which acts to plasticize both the plastic material of the letter face and the plastiic strip material. The bond between the strip and the metal is unaffected. As the two plastic materials are plasticized, they comingle with the adhesive material so that when allowed to set, a rigid intergral bond is formed between the face and the strip. To seal the bond completely, a coating of heavy acrylic plasticizer and solvent mixture can later be applied to the bond.

Opaque wall 20 is typically fastened at the same time to edge 32 of the stripping 40. Typically, it is abutted to the stripping so that the foam strip 42 forms a light lock between the exterior of the sign and the interior of the sign. Thus, the foam strip acts as a light seal, keeps dirt from penetrating the interior of the sign, acts as a repellant against the gross intrusions of moisture and assists in the bonding between the opaque wall 20 and the strip 42.

It should be noted that the abutted convolute 34 serves two functions. First, the abutted convolute forms a border against which the translucent sign material 12 can rest. Secondly, the convolute 34 acts as a light stop. It prevents light passing either through strip 25 or in any interstitial area between strip 25 and the abutted translucent face material 12 from reaching viewers of the display. A visually uniform and clean sign border results.

The improved sign strip of this invention can now be compared to that existant in the prior art, particularly by the patent to Minogue, U.S. Pat. No. 3,414,305, issued in 1968.

Referring to FIG. 3, edge 30′ of sheet metal strip 14′ includes a first convolute 46 and a second convolute 48. Interior of the convolutes 46 and 48, a plastic strip 25′ is gripped at its own convolute 50. Thus, there is seen a five layer thickness of material along line 51 through the edge 30′. This has disadvantages.

Observing FIG. 1 and the circumscribing metal sheet strip shell, it will be observed that at numerous places the metal includes 90° bends. Indeed, in many sign characters, bends to an acute angle can be anticipated. It has been found that if metal sheet strip 14′ having a Pittsburgh lock as illustrated at its edge 30′ is bent, especially to a right angle or an acute angle, material failure occurs. This material failure either occurs in the metal, in the plastic, or both. It is believed due to the overlying five layer thickness at the edge 30′ along line 51. The improved product of FIG. 4 does not have this characteristic.

An additional disadvantage has been found in the material of the prior art. Typically, when translucent face 12 is fastened, as by gluing, to the mechanically held strip 25′ and allowed to cure, the characteristic of the glue between the translucent face 12 and plastic strip 25′ is such that the strip 25′ is pulled away from the underlying non-abraded metal of the metal sheet strip siding 14′. When this pulling away occurs, an area is defined between the sheet metal strip 14′ and the underside of the stripping 25′ in which dirt particles are attracted and accumulate in an unsightly fashion. It has been found that with the passage of time the borders of the sign become irradically obscured, unsightly, and either have to be cleaned or replaced. A product of FIG. 4 relying on the improved sheet metal strip siding of this invention does not have that characteristic.

Full understanding of the manufacture of the product of this invention can be best understood by first setting forth the apparatus for the manufacture thereof. In explaining the apparatus for the manufacture, the process as well as some of the advantages of the product produced can be set forth.

FIG. 5 is illustrative of a machine adapted for the process of this invention. As the product is formed on a continuous process mill, material for the product must be continuously dispensed to the mill. Typically, sheet metal strip is dispensed from a convolute roll A. As hereshown, roll A is shown dispensing with roll A′ loaded and ready to replace the dispensing function as roll A empties. Foam stripping 42 is dispensed from rolls B and B′. As hereinbefore set forth, foam strip 42 is coated on its bottom portion with a pressure sensitive adhesive. This pressure sensitive adhesive is protected by a silicone coated Mylar protective coating which is peeled from stripping 42 as it is applied to the metal sheet strip 14. Plastic stripping is dispensed from rolls C and C′, roll C here being shown dispensing the stripping. Glue is dispensed from a pressurized glue pot D to a dispensing head J.

Having briefly summarized the dispensing apparatus of this machine, the processing portion can not be set forth. Sheet metal strip 14 first passes through a preheat station E including four 200 Watt infrared lightbulbs. As sheet metal strip 14 sequentially passes through the machine, it next comes in contact with a grinder F. Grinder F serves to abrade band 23 on the aluminum sheet metal strip 14 along a path underlying the plastic strip 25. Thereafter, the sheet metal strip passes through rolling mill G. At rolling mill G, the sheet metal strip edges 30, 32 are convoluted, glue coating 24 is applied, the plastic strip 25 is applied, and the plastic strip registered to the freshly convoluted side 30 of the sheet metal strip. Thereafter, the sheet metal strip 14 passes through a curing station H, finally to downstream product takeup rollers I.

Preheater E is conventional in construction but located along the path of sheet metal strip 14 at a juncture where the metal is heated by the preheater before it is worked in any way.

Grinder F is conventional and includes an abrading wheel 60 interior of a box 62 connected to a vacuum hose (not shown). Working in opposition to grinding wheel 60 there is an opposition roller 64 underlying the strip 14 as it passes through the grinder.

The grinder F also includes a telescoping bottom 65. Bottom 65 slides upwardly and downwardly on the strip as the grinder F is adjusted and away from strip 14 pursuant to the wear of wheel 60.

Grinder F is adjusted to remove completely the alkalineamine epoxy coating on the aluminum sheet. Further, it abrades the underlying aluminum. These abrasions are in the order of 1/64 inch thick and constitute abraded band 23.

It will be noted at this juncture, that prior to the application of the glue, strip 14 has passed through the preheating station E and the grinder F. At both these stations, heat energy has been absorbed. Thus, preheating in advance of the application of glue E on sheet metal strip 14 occurs.

The main processing of the sheet strip 14 from its sheet to a finished product can best be understood with reference to FIGS. 6 through 18.

Referring to FIGS. 5 and 6, sheet metal strip 14 initially passes between two opposed rubber rolls 60 and 61. Each of the rolls 60 and 61 are mounted on shafts 62 and 63 respectively. Shafts 62 and 63 are journaled at their respective ends in journals 65.

Opposed rubber rollers 60-61 serve to impart the velocity to metal strip 14 as it passes through the machine. It will be remembered that this metal strip 14 is painted. Thus, the drive rollers and working rollers are designed not to mark, scar, or otherwise mar the painted surface of the metal strip.

Foam strip 42 is applied at opposed drive rollers 60-61. Referring briefly to FIG. 5, it will be seen that the foam strip 42 is dispensed from the roller B toward the opposed rollers 61-62. Immediately prior to roller 61 as shown in FIG. 5, the releasable Mylar coating 67 is removed from the pressure sensitive adhesive on the bottom of strip 42. Thereafter, the foam passes between roller 61 and the metal sheet strip 14. In passing, the pressure sensitive adhesive firmly fastens the foam stripping to the metal sheet strip 14.

Metal sheet strip 14 next passes to opposed rollers 64, 64′ on shaft 66 and 65, 65′ on shaft 67.

Observing all of the rollers 64, 64′, 65 and 65′, it will be seen that they are all similarly shaped.

Referring to roller 64, it will be seen that this roller includes a first smaller cyclindrical portion 70, a second larger diameter but smaller length cylindrical portion 72 and an intermediate frustro-conical section 73.

it will be further observed that the rollers of FIGS. 7, 9, 10 and 11 work opposite edges of the metal strip 14 in identical fashion. Therefore, only the left working side of the rollers will be discussed, it being understood that those having ordinary skill in the art will understand that identical working on the opposed edge at the same time produces the same result as well as providing a centering function to the metal strip 14 as it passes through the rolling mill.

It should also be understood at this juncture that each of the rollers shown in FIGS. 7, 9, 10, 11, 12, 13, 15, 16 and 17 are adjustably mounted along the lengths of their respective shafts. Referring to the detail of FIG. 7 and rollers 64 and 64', it will be seen that both rollers are mounted to shaft 66. Shaft 66 is equipped with the keyway 69 running along the entire length. Allen screws 70 and 70' are mounted to set the rollers at preselected opposing distances along the shaft 66.

Referring briefly to FIG. 5, another feature of the adjustability of these rollers can be understood. Regarding this feature, each of the rollers is mounted within journals, each journal being carried by separate blocks. Upon changing the thicknesses of strip 14 passing through the rolling mill G, shimstock is typically mounted under the roller journals as they are secured to the machine. This causes correspondent raising and lowering of the rollers for corresponding thicker and thinner thicknesses of metal.

Roller 64 is typically registered so that its frustroconical portion 73 accommodates at its upper end edge 30 of sheet strip 14. Overlying and opposing roller 65 is registered so that its large diameter 72 bears upon the small diameter 70 of the underlying roll 64. As is illustrated, this results in an obtuse angle crimp of edge 30 of metal strip 14.

Referring to FIG. 6 and to foam strip 42, it will be noted that this strip after passing between the opposed rubber drive rollers 60 and 61 of FIG. 6 has fully expanded. It is characteristic of the closed cell foam used with this invention that compression and the subsequent expansion in no way harms the foam or its characteristics.

Immediately passing through roller 65', metal strip 14 passes on to a gluing station.

Referring to FIG. 5, glue is actuated to flow from glue pot D by inflowing air from air conduit 80 through a pressure regulator 81. Typically, glue 82 interior the pot D is forced upwardly through a glue conduit 84 to the top of the rolling mill G. An air actuated cylinder 85 opens and closes a valve 86 to cause glue to flow.

Referring to FIG. 8, glue is metered by a petcock 87 in conduit 84 and outflows at spout 88 to the surface of metal 14. As will be remembered, the glue is flowed directly onto the abraded band 23 of sheet metal strip 14. Thereafter, the glue passes through a spreader 89. Spreader 89 functions to spread the glue substantially over the length of the abraded band 23 on the sheet metal strip 14.

The metal sheet strip then passes on to rollers illustrated in FIG. 9. Rollers 90 and 90' are of the same construction as roller 64 in FIG. 7. Opposed bottom rollers 91 and 91' are of a different construction. They include a first large cylindrical portion 93 and a small cylindrical portion 94 with a right angle surface 95 interconnecting these surfaces. Typically, roller 90 is adjusted along its shaft so that it abuts surface 95 at the outer portion of its surface 96. This takes the obtuse 45° angle bend in metal edge 30 and converts it to a right angle bend. As is apparent, this occurs on both edges 30 and 32 simultaneously.

The sheet strip then passes on to the rollers illustrated in FIG. 10. Typically, the rollers of FIG. 10 include upper rollers 100 and 100' and lower opposed rollers 102 and 102'. Upper roller 100 has precisely the same configuration and alignment as roller 65 and is positioned relative to edge 30 of strip 14 so as to produce an acute angle crimp in the edges 30. The working of edge 32 is similar.

Roller 100 illustrated in FIG. 10 has mounted about it a roller 104. With reference to FIGS. 5 and 10, it can be seen that the plastic strip 25 dispensed from roller C passes around roller 100 and on the top of the glue layer 24. Roller 104 serves to firmly press strip 25 causing the glue to occupy the full interstitial area between the abraded band 23 on metal strip 14 and the lower surface of strip 25.

With reference to FIG. 11, strip 14 then passes on to opposed cylindrical rollers 105, 105' and lower rollers 106 and 106'. As illustrated in FIG. 11, these rollers serve to close the crimp on edges 30 and 32 into a U-shaped convolute.

Referring to FIG. 12, strip 14 then passes on to rollers 107, 108. These rollers work edge 30 in a manner identical to that previously described with reference to FIG. 7.

Referring to the rollers of FIG. 12, it will be noted that only edge 30 is worked. Edge 32 is not worked. As is apparent to those skilled in the art, when one edge of a passing strip of metal is worked, a sidewise thrust from the rollers 107 and 108 towards edge 32 of the strip 14 will result. To resist such a movement, a buffer roller 109 is mounted at intervals.

Strip 14 next passes to the opposed rollers 110 and 111. These rollers are identical in configuration to those illustrated in FIG. 9, and will not be further discussed herein. It will, however, be noted that edge 30 already having a first convolute therein is worked to a 90° bend so that the entirety of the first convolute is bent over.

Referring to FIG. 14, it will be remembered that the plastic strip 25 placed on the metal strip 14 at abraded band 23 is freshly placed with respect to glue layer 24. Typically, it is necessary to register strip 25 in anticipation of the remaining fold on edge 30 of strip 14. This is done by an arm 114 pressing against the edge 116 of strip 25.

Referring to FIG. 15, metal strip 14 thereafter passes on to the roller 120 and 121. As these rollers are identical to those illustrated in FIG. 10, they will not be further discussed.

Referring to FIG. 16, strip 14 passes between opposed cylindrical rollers 125 and 126. These rollers close the first convolute firmly, in abutment with the edge 39 of strip 25. This functions to form the light stop previously illustrated with respect to FIG. 4.

Referring to FIG. 17, strip 14 then passes to rollers 123 and 124. Roller 123, being identical to the construction of roller 65 illustrated in FIG. 7, has its large diameter surface 72 adjusted to close the end of the second convolute on edge 32. As is illustrated, this causes the first convolute to overlap the edge 39 of strip 25 as illustrated in FIG. 4 by forming the obtuse angle bend 38 in the edge 30 of strip 14.

Strip 14 then passes onwardly to an arm 130. As is shown in the perspective view of FIG. 8, arm 130 presses firmly down on top of the strip 25 to make sure the strip is adhering to the upper surface of the metal sheet strip 14. It will be noted that, at this juncture, the product is essentially complete, save and except for the curing which occurs at curing station H.

It will be noted that there is a piece of reflective metal 155 between roll C and the heat lamps 150 of curing station H. This metal shield prevents the plastic of strips 25 from melting under the heat of the curing station H and further, by reflection, enhances the curing of the strip 25 on the metal.

Thereafter, the product passes on to the convolute take-up rolls I and I', the roll I hereshown being connected. These rolls function to wrap the finished product in a convolute configuration so that it may subsequently be cartoned and shipped to its destination.

Some comments can be made about the convoluted roll I. First, the strip 42 functions to buffer the successive layers of material wound in the convolute roll. This strip 42 prevents an overlying layer of sheet metal strip from scarring, marring, or otherwise injuring an underlying layer of sheet metal strip.

It will be remembered with respect to FIG. 6 that opposed rollers 60 and 61 drive the metal as it passes through the rolling mill G. Each of these drive rollers has a diameter and rotational speed which is essentially the same as the working diameter and rotational speed of each of the working rollers illustrated in FIGS. 7, 9, 10, 11, 12, 13, 15, 16 and 17. Scarring, marring or scratching of the metal being worked is prevented.

Referring to FIG. 19, a drive mechanism is illustrated for driving all the rollers at the same rotational speed. Typically, a variable speed motor 140 drives a first sprocket 141 through a chain 142. A second sprocket (obscured in the view hereshown) drives an elongate chain 145. Chain 145 is wound around in an S-shaped configuration about the respective shafts of each of the rollers previously illustrated. This S-shaped configuration powers each of the rollers at precisely the same rotational speed. When the rollers move at the same rotational speed, they do not scar, mark, or otherwise mar the painted surfaces of the sheet strip 14.

The S-shaped configuration of the chain 145 has an additional advantage. It will be remembered that each of the journals for the overlying rollers must be movable towards and away from the journal for the underlying rollers to accommodate varying thicknesses of metal. The S-shaped configuration here illustrated will permit a moderate amount of such movement without the requirement of adding chain lengths or the like.

While this invention has been illustrated in some detail, it should be apparent that various changes and modifications may be made without departing from the spirit hereof. For example, plastic strip 25 could be placed on both edges 30, 32 of strip 14 as well as one edge thereof. Moreover translucent siding 12 could be on both sides, as well as one side of character 10. Additionally, the fold of the convolute edges can be changed. Like modification can be made without departing from the spirit and scope of this invention.

What is claimed is:

1. An apparatus for producing circumscribing sheet metal siding for plastic sign characters comprising: means for dispensing at a continuous rate a strip of sheet metal material having two parallel spaced apart side edges to a working station; a grinder at said working station overlying one edge of said continuously passing sheet metal strip for abrading a band adjacent one of said edges of said sheet metal strip as said strip passes said working station; means for applying plastic-to-metal adhesive at said working station to said continuously passing sheet metal strip on said abraded band; means for continuously dispensing to said working station a plastic strip; means for continuously compressing said plastic strip onto said sheet metal band at said abraded glued layer at a preselected point at said working station; means for curing said adhesive to bond said plastic strip to said abraded band on said sheet metal strip; takeup means for said complete sheet metal strip at the downstream end of said working station; and including opposed rollers for convoluting both edges of said sheet metal strip.

2. An apparatus for producing circumscribing sheet metal siding for plastic sign characters comprising: means for dispensing at a continuous rate a strip of sheet metal material having two parallel spaced apart side edges to a working station; a grinder at said working station overlying one edge of said continuously passing sheet metal strip for abrading a band adjacent one of said edges of said sheet metal strip as said strip passes said working station; means for applying plastic-to-metal adhesive at said working station to said continuously passing sheet metal strip on said abraded band; means for continuously dispensing to said working station a plastic strip; means for continuously compressing said plastic strip onto said sheet metal band at said abraded glued layer at a preselected point at said working station; means for curing said adhesive to bond said plastic strip to said abraded band on said sheet metal strip; takeup means for said completed sheet metal strip at the downstream end of said working station; and including opposed rollers for convoluting said edge of said sheet metal strip adjacent said band and means for registering said plastic strip to said convoluted edge.

* * * * *